United States Patent
Serebrin et al.

(10) Patent No.: US 9,697,358 B2
(45) Date of Patent: Jul. 4, 2017

(54) NON-VOLATILE MEMORY OPERATIONS

(71) Applicant: GOOGLE INC., Mountain View, CA (US)

(72) Inventors: Benjamin Charles Serebrin, Sunnyvale, CA (US); Jonathan M. McCune, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 627 days.

(21) Appl. No.: 13/917,261

(22) Filed: Jun. 13, 2013

(65) Prior Publication Data

US 2014/0372665 A1    Dec. 18, 2014

(51) Int. Cl.
*G06F 21/57* (2013.01)
*G06F 21/64* (2013.01)
*G06F 9/445* (2006.01)

(52) U.S. Cl.
CPC ............ *G06F 21/572* (2013.01); *G06F 8/65* (2013.01); *G06F 21/64* (2013.01)

(58) Field of Classification Search
CPC ........ G06F 21/572; G06F 21/60; G06F 21/64; G06F 17/30; G06F 17/30286; G06F 17/30312; G06F 8/65
USPC ......................................................... 726/27
See application file for complete search history.

(56) References Cited

U.S. PATENT DOCUMENTS 6,272,533 B1 * 8/2001 Browne ................. G06F 21/82
709/213
6,289,458 B1 * 9/2001 Garg ................... G06F 21/6281
726/1
7,050,892 B1 * 5/2006 Liebl .................... G06F 21/121
701/32.6
7,228,411 B1 * 6/2007 Kumar ................ G06F 11/2284
713/2
2005/0114554 A1 * 5/2005 Azadet .................. G06F 13/128
710/1

(Continued)

FOREIGN PATENT DOCUMENTS

WO    2014/200695 A1    12/2014

OTHER PUBLICATIONS

"Atmel CryptoMemory Specification Datasheet", Atmel Corporation, AT88SC0104C/0204C/0404C/0808C/1616C/3216C/6416C/12816C/25616C, Rev: 5211D-CRYPTO-12/11, 2011, 69 pages.

(Continued)

*Primary Examiner* — Saleh Najjar
*Assistant Examiner* — Khang Do
(74) *Attorney, Agent, or Firm* — Brake Hughes Bellermann LLP

(57) ABSTRACT

An apparatus includes an interface module, a controller, a key storage module, where the key storage module is configured to store a key, and a non-volatile storage module that is configured to store data. The non-volatile storage module has a first partition and a second partition, where the first partition is designated as a read-only storage area for the data and the second partition is designated as a write-only storage area for new data. The first partition is re-designated as the write-only storage area for other new data and the second partition is re-designated as the read-only storage area for the new data in response to the new data being written to the second partition with a signature and the controller verifying the signature using the key stored in the key storage module.

27 Claims, 4 Drawing Sheets

(56) References Cited

U.S. PATENT DOCUMENTS

| | | | |
|---|---|---|---|
| 2005/0177608 A1* | 8/2005 | Lee | H04L 27/265 708/404 |
| 2006/0047629 A1* | 3/2006 | Gabbert | G06F 17/30595 |
| 2007/0234339 A1 | 10/2007 | Kostadinov et al. | |
| 2008/0184040 A1* | 7/2008 | Bade | G06F 21/572 713/189 |
| 2008/0263348 A1* | 10/2008 | Zaltsman | G06F 8/63 713/2 |
| 2009/0327741 A1 | 12/2009 | Zimmer et al. | |
| 2010/0278533 A1* | 11/2010 | Julien | H04Q 11/0067 398/58 |
| 2011/0047356 A2 | 2/2011 | Flynn et al. | |
| 2011/0066837 A1 | 3/2011 | Lee et al. | |
| 2011/0137435 A1 | 6/2011 | Furusawa et al. | |
| 2011/0138166 A1 | 6/2011 | Peszek et al. | |
| 2011/0161943 A1* | 6/2011 | Bellows | G06F 9/4843 717/149 |
| 2012/0167205 A1* | 6/2012 | Ghetie | G06F 21/572 726/22 |
| 2012/0239972 A1 | 9/2012 | Shibata et al. | |
| 2013/0185799 A1* | 7/2013 | Pfeifer | G06F 21/57 726/24 |
| 2013/0204911 A1* | 8/2013 | Chaterjee | G06F 17/30312 707/812 |
| 2014/0229729 A1* | 8/2014 | Roth | H04L 63/0471 713/153 |
| 2014/0325640 A1* | 10/2014 | Aggarwal | G06F 21/31 726/18 |
| 2014/0351585 A1* | 11/2014 | Hayashi | H04N 5/913 713/164 |

OTHER PUBLICATIONS

"Atmel CryptoMemory Summary Datasheet", Atmel Corporation, AT88SC0104CA, Rev: 5200FS-CRYPTO-12/11, 2011, 23 pages.

International Search Report and Written Opinion for PCT Patent Application No. PCT/US2014/039817, mailed on Oct. 2, 2014, 16 pages.

Extended European Search Report from Application No. EP14810905.1, mailed Jan. 2, 2017, 8 pages.

* cited by examiner

NON-VOLATILE MEMORY OPERATIONS

TECHNICAL FIELD

This description relates to systems and methods for non-volatile memory operations, including electrically erasable programmable read-only memory (EEPROM) operations.

BACKGROUND

Computer systems include the use of non-volatile storage devices to store data such as device configuration information and other sensitive information like serial numbers, identifiers and cryptographic keys. The non-volatile storage devices may include non-volatile read-only memories (ROMs), including electrically erasable programmable read-only memories (EEPROMs), that are used to store read-only code or other read-only information, as mentioned above. In some instances, updated or new data may be written to the non-volatile storage devices. It may be desirable to prevent against malicious or accidental reprogramming of the non-volatile storage device. It also may be desirable to update or write new data to the non-volatile storage device that is trusted.

SUMMARY

This document describes devices and techniques for controlling data in a non-volatile storage device in a secure manner. In one example implementation, a non-volatile storage device includes a non-volatile storage module that is partitioned into multiple partitions for storing data. For example, the non-volatile storage module may be partitioned into a first partition and a second partition. The first partition may be designated as a read-only storage area and the second partition may be designated as a write-only partition. In this manner, data may only be read from the read-only partition. A controller controls which partition is the read-only partition and which partition is the write-only partition. In this manner, external devices may only read from the read-only partition.

New data may be written to the second partition, which is the write-only partition in this example, by an external device. The new data may include a signature that is appended to the new data. The controller confirms that the new data is trusted and secure by verifying the signature using a key stored in a key storage module on the non-volatile storage device. After receiving a complete copy of the new data and verifying the signature, the controller may re-designate the second partition, which now stores the new data, as the read-only partition and re-designate the first partition as the write-only partition, where other new data may be written. In this manner, new data, or images, that are written to the non-volatile storage device are first confirmed to be certified or trusted by verifying the signature appended to the new data before the new data may be read out from the device. New data that is incomplete or that cannot be verified may be discarded.

In one example implementation, the controller and the key storage module may be on the same chip as the non-volatile storage module. In another example implementation, the controller and the key storage module may be on a chip that is separate from the non-volatile storage module. In one example implementation, the key storage module may be on the same chip as the controller and in another example implementation, the key storage module may be on the same chip as the non-volatile storage module, which may be a chip that is separate from the chip that includes the controller.

In one example implementation, the devices and techniques described may be used to program or re-program non-volatile storage devices during manufacturing and production processes.

According to one general aspect, an apparatus includes an interface module, a controller, a key storage module, where the key storage module is configured to store a key, and a non-volatile storage module that is configured to store data. The non-volatile storage module has a first partition and a second partition, where the first partition is designated as a read-only storage area for the data and the second partition is designated as a write-only storage area for new data. The first partition is re-designated as the write-only storage area for other new data and the second partition is re-designated as the read-only storage area for the new data in response to the new data being written to the second partition with a signature and the controller verifying the signature using the key stored in the key storage module.

In another general aspect, an apparatus includes an interface module and a key storage module that is configured to store a key. A controller is operably coupled to the interface module and to the key storage module. The controller is configured to interface with an external non-volatile storage device for storing data. The controller is configured to partition the external non-volatile storage device into a first partition and a second partition. The first partition is designated as a read-only storage area for the data and the second partition is designated as a write-only storage area for new data received through the interface module. The controller is configured to receive the new data having a signature through the interface module and write the new data to the second partition, verify the signature using the key stored in the key storage module and re-designate the first partition as the write-only storage area for other new data and re-designate the second partition as the read-only storage area for the new data in response to verifying the signature using the key stored in the key storage module.

In another general aspect, a method includes partitioning a non-volatile storage device into a first partition and a second partition. The first partition is designated as a read-only storage area for data and the second partition is designated as a write-only storage area for new data received through an interface module. The method includes receiving the new data having a signature through the interface module and writing the new data to the second partition, verifying, by a controller, the signature with a key stored in a key storage module and re-designating the first partition as the write-only storage area for other new data and re-designating the second partition as the read-only storage area for the new data in response to verifying the signature with the key stored in the key storage module.

In another general aspect, an apparatus includes a means for interfacing, a means for controlling, a means for storing a key, where the means for storing a key is configured to store a key, and a means for non-volatile storage that is configured to store data. The means for non-volatile storage has a first partition and a second partition, where the first partition is designated as a read-only storage area for the data and the second partition is designated as a write-only storage area for new data. The first partition is re-designated as the write-only storage area for other new data and the second partition is re-designated as the read-only storage area for the new data in response to the new data being written to the second partition with a signature and the means for controlling verifying the signature using the key stored in the means for storing the key.

The details of one or more implementations are set forth in the accompanying drawings and the description below. Other features will be apparent from the description and drawings, and from the claims.

DETAILED DESCRIPTION

Figure 1:
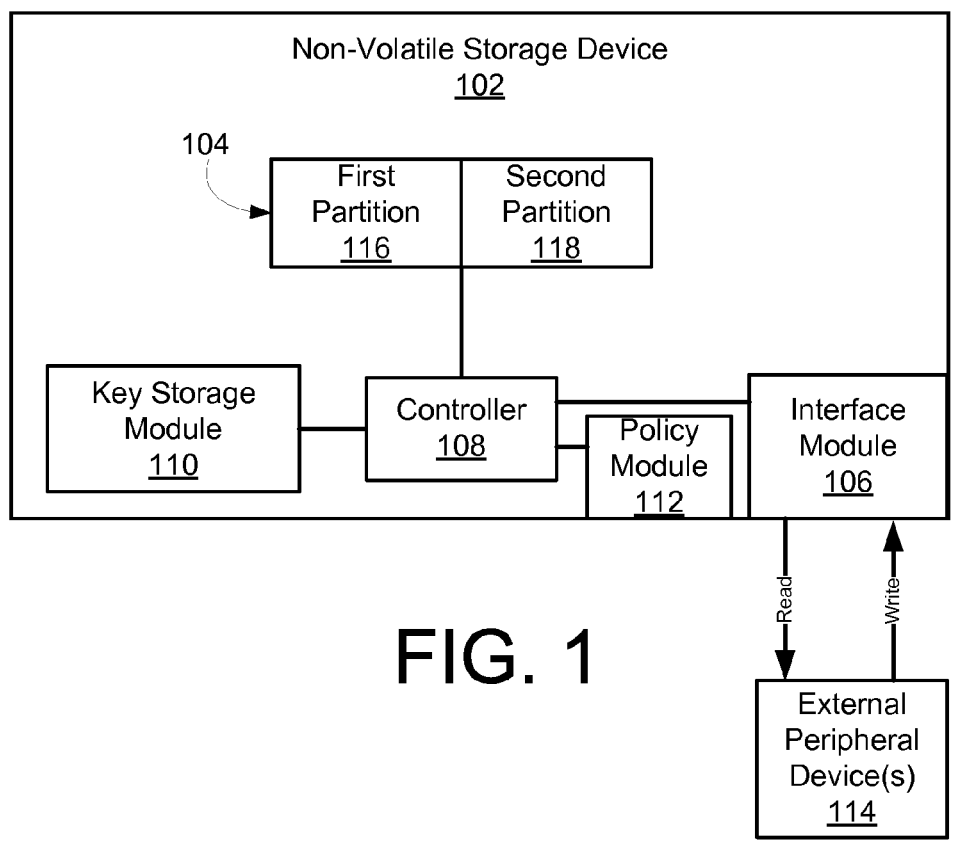
FIG. 1 is an example block diagram of a non-volatile storage device.

FIG. 1 is an example block diagram of a non-volatile storage device 102. The non-volatile storage device 102 includes a non-volatile storage module 104, an interface module 106, a controller 108, a key storage module 110 and a policy module 112. In general, the non-volatile storage device 102 is configured to receive data through the interface module 106 and to write the data to the non-volatile storage module 104. For example, an external peripheral device 114 may write the data to the non-volatile storage device 102. The data also may be read from the non-volatile storage device 102 through the interface module 106. For example, the external peripheral device 114 may read the data from the non-volatile storage device 102 through the interface module 106.

The non-volatile storage device 102 also may be referred to as storage device 102 interchangeably throughout this document to refer to the same component. The non-volatile storage device 102 may be different types of storage devices, including different types of read-only memory (ROM) devices. For example, the non-volatile storage device 102 may be an electrically erasable programmable read-only memory (EEPROM). In other examples, the non-volatile storage device 102 may be flash memory, phase change memory (PCM), spin torque transfer (STT) memory, memristors as well as other non-volatile storage devices.

In one example implementation, the interface module 106 may be a serial interface module. For example, the interface module 106 may be a serial interface module capable of supporting one or more serial interfaces including, but not limited to, a low pin count (LPC) interface, an I-squared-C ($I^2C$) interface, a 1-wire interface, a serial peripheral interface (SPI) and a single-wire interface. Other serial interfaces may be implemented as well. The read and write bus connecting the interface module 106 to the external peripheral device 114 may be a bus corresponding to the type of interface supported by the interface module 106. In some implementations, the interface module 106 may support more than one type of serial interface.

In one example implementation, the interface module 106 may be a parallel interface module. For example, the interface module 106 may be a parallel interface module capable of supporting one or more parallel interfaces. The read and write bus connecting the interface module 106 to the external peripheral device 114 may be a bus corresponding to the type of interface supported by the interface module 106. In some implementations, the interface module 106 may support more than one type of parallel interface.

In one example implementation, the interface module 106 may be capable of supporting both serial and parallel interfaces. For example, the interface module 106 may be capable of supporting one or more of the serial interfaces described above and one or more of the parallel interfaces described above.

The non-volatile storage module 104 in the non-volatile storage device 102 may be configured to store data. The non-volatile storage module 104 also may be referred to as storage module 104 interchangeably throughout this document to mean the same component. The storage module 104 may be implemented in different storage capacities. For example, the storage module 104 may include 8 Kbytes, 16 Kbytes, 32 Kbytes, 64 Kbytes, 128 Kbytes, 256 Kbytes of storage capacity. In other implementations, the storage module 104 may include larger sizes of storage capacity.

The controller 108 may be configured to partition the storage module 104 into multiple partitions. In one example implementation, the controller 108 may partition the storage module 104 into a first partition 116 and a second partition 118. While FIG. 1 illustrates two partitions, more than two partitions are possible. In one implementation, the controller 108 may evenly divide the storage capacity of the storage module 104 between the first partition 116 and the second partition 118. For example, if the storage capacity of the storage module 104 is 128 Kbytes, then the first partition 116 may be allocated 64 Kbytes of storage area and the second partition 118 may be allocated 64 Kbytes of storage area. In another example, if the storage capacity of the storage module 104 is 256 Kbytes, then the first partition 116 may be allocated 128 Kbytes of storage area and the second partition 118 may be allocated 128 Kbytes of storage area. In other example implementations, the controller 108 may partition the storage module 104 in non-equal amounts and/or may partition the storage module 104 into more than two partitions.

The controller 108 may partition the storage module 104 by assigning one set of addresses (or memory addresses) to the first partition 116 and assigning another set of addresses to the second partition 118. The controller 108 may assign the addresses either sequentially or non-sequentially. The controller 108 may track the assignment of the addresses and the corresponding partitioning of the storage module 104 by using a table, where the table may be stored in another module such as, for example, in the key storage module 110, the policy module 112 or another table storage module (not shown). The controller 108 may use other schemes to partition the storage module 104.

In one example implementation, the controller 108 may designate one of the partitions as a read-only partition and the other partition as a write-only partition. For example, the controller 108 may designate the first partition 116 as the read-only partition and may designate the second partition 118 as the write-only partition. The controller 108 may control the function of the partition as read-only or write-only by controlling the addresses that may be read from or written to by the external peripheral device 114. In this manner, the controller 108 may point to the addresses that correspond to the read-only partition to fulfill read requests received from an external peripheral device 114. Thus, if the first partition 116 is designated as the read-only partition, then the controller 108 satisfies read requests by pointing to the addresses for the first partition 116 to read the data out of the storage module 104. If the second partition 118 is designated as the write-only partition, then the second partition 118 is not used to respond to read requests.

Said in another way, the controller 108 may perform any necessary address translation to satisfy read requests from the external peripheral device 114 since the controller 108 is aware of the partition scheme. The external peripheral device 114 may not be aware of the partition scheme and does not need to be aware of the scheme since it is controlled by the controller 108.

In one example implementation, reads of the data from the storage device 102 by the external peripheral device 114 may be in plaintext. In other example implementations, reads of the data from the storage device 102 by the external peripheral device 114 may be encrypted using an encryption scheme between the storage device 102 and the external peripheral device 114.

In one example implementation, writes of data to the storage device 102 may be written to the partition designated as the write-only partition. Writes to the storage device may be signed plaintext writes and/or may be signed encrypted writes.

In one example implementation, the external peripheral device 114 may write data or a new image to the storage device 102. The external peripheral device 114 may write plaintext data to storage device 102 that is signed with a signature appended to the message containing the data. For example, the external peripheral device 114 may compute a cryptographic hash of the data and sign the cryptographic hash using a private key. In other example implementations, a different external device (not shown) other than the external peripheral device 114 may compute the cryptographic hash and sign the cryptographic hash using the private key. In another example implementation, the external peripheral device 114 may compute a cryptographic message authentication code of the data and a secret key, with the resulting message authentication code serving the role of the signature. The external peripheral device 114 then communicates the signed data to the storage device 102.

The storage device 102 receives the signed data through the interface module 114. The controller 108 writes the received signed data to the partition designated as the write-only partition. For instance, if the second partition 118 is designated as the write-only partition, then the controller causes the data to be written to the second partition 118. As the data is received, the controller 108 verifies the signature appended to the data. That is, the controller 108 may calculate a cryptographic hash of the data as the data is being received. The controller 108 may use a key that corresponds to the key used to sign the message to verify the signature. The key may correspond by being the public component of a public-private keypair, or it may be the same secret key shared with the external peripheral device 114. The key used by the controller 108 to verify the signature may be stored in the key storage module 110.

In one example implementation, the key storage module 110 may store one or more keys that correspond to keys held by trusted sources. The key storage module 110 may be a non-volatile storage module. In this manner, data having signatures can be verified by the controller 108 using one of the keys stored in the key storage module 110. For example, the key storage module 110 may store a public key that corresponds to a private key held and used by the external peripheral device 114. The public key is used by the controller 108 to verify the signature of the data being written to the storage device 102 by the peripheral device 114. In another example, the key storage module 110 may store a secret key that corresponds to a shared secret key held and used by the external peripheral device 114.

In one example implementation, the controller 108 verifies the signature appended to the received message by calculating a cryptographic hash and using the key stored in the key storage module 110 to compute whether the signature is a result of the holder of the private key signing the cryptographic hash of that exact message. In one example, the controller 108 may calculate a streaming cryptographic hash as the data is being streamed in to the storage device 102 through the interface module 106. In another example, the controller 108 may first receive all of the data and then calculate the cryptographic hash after all of the data have been received. In one example, the controller 108 may calculate a key message authentication code over the received message and compare that to the signature appended to the received message to determine if the message is valid.

Upon receiving a complete copy of the data and verifying the signature, the controller 108 may re-designate the write-only partition, which just received the new data, as the read-only partition. The controller 108 may re-designate the read-only partition, which stored the old data, as the write-only partition to receive other new data (or writes of new data) that may be sent by the peripheral device 114 through the interface module 106. The newly designated write-only partition is then configured to receive the next write of data to the device, which also may be referred to as other new data.

For example, in response to receiving a complete copy of the data and verifying the signature attached to the data, the controller 108 may re-designate the second partition 118 as the read-only partition. The controller 108 may perform the re-designation by changing a pointer to the address or addresses that read commands are directed to such that only the data stored in the second partition 118 may be read. The controller 108 also re-designates the first partition 116 from the read-only partition to the write-only partition. In this manner, subsequent writes of new data to the storage device 102 will be stored in the first partition 116.

There may be one or more instances when the controller 108 does not re-designate the partitions during a write process. For example, if the data received during a write is not a complete copy of the data, then the controller 108 will not re-designate the partitions 116, 118. In this manner, if the storage device 102 is an EEPROM, then an incomplete image that is written to the second partition 118 will not be read out of the storage device 102 because the current read-only partition will remain the read-only partition and the write-only partition, which received the incomplete or partial copy, will remain a write-only partition. The partial data that may have been written to the write-only partition may be deleted or may be written over.

In another example, if the signature for the new data cannot be verified, then the controller 108 does not re-designate the partitions. For example, if the cryptographic hash computed by the controller 108 does not match the cryptographic hash attached to the data, then the controller 108 will not re-designate the partitions such that the read-only partition remains the read-only partition and the write-only partition remains the write-only partition. If the signature cannot be verified using the key in the key storage module 110, then the controller 108 will not re-designate the partitions such that the read-only partition remains the read-only partition and the write-only partition remains the write-only partition.

In one example implementation, a new key may be appended to the message that is being written to the storage device 102. The message with the new key may be signed with a signature using a private key that corresponds to a key stored in the key storage module 110. Upon verification of the signature by the controller 108, the new key is stored in the key storage module 110 and may be made active for use in verifying the signature for subsequent writes to the storage device 102. In this manner, the public key stored in the key storage module 110 may be updated in a secure manner from a trusted source. The new key may be deleted from being stored with the data in the non-volatile storage module 104 such that the new key is only stored in the key storage module 110. In another example, a message authentication code may be appended to the message that is being written to the storage device and stored in the key storage module 110 for use in verifying the signatures of new incoming messages.

In one example implementation, the policy module 112 may store information relating to the storage device 102 including, for instance, a unique identifier for the storage device 102. The policy module 112 may store version number or other additional identifying information related to the data stored in the read-only partition. The policy module 112 also may store other policy rules or instructions related to actions that to be taken by the controller 108 upon the receipt of new data. The policies and information stored in the policy module 112 may be updated with new policies appended to new data when the controller 108 verifies the signature on the new data using the key in the key storage module 110.

In one example implementation, a bitmask may be used in the data that is sent to the storage device 102. The bitmask may be used to include information in the data that is to be stored in the policy module 112. For example, the bitmask may be used as a permissions mask to include permission information that is stored in the policy module 112. Also, the bitmask may be used to assign unique numbers to each storage device 102. For example, the peripheral device 114 may assign an Ethernet MAC address to the storage device 102 that is separate from a device serial number. In one implementation, the bitmask information may be always writeable to the device. In other implementations, the bitmask information may be writable to the storage device 102 in the policy module 112 using a key that is different from the key used to verify the signature of the data. The key used to write the bitmask information also may be stored in the key storage module 110.

Figure 2:
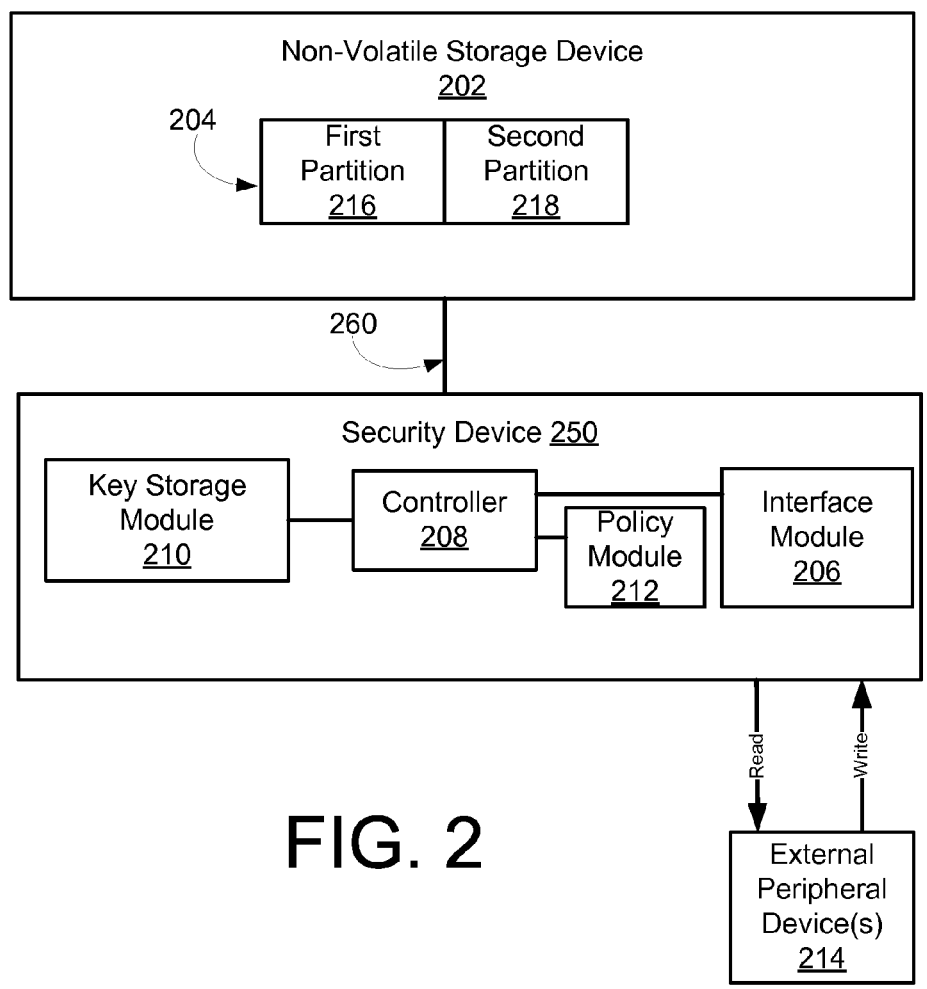
FIG. 2 is an example block diagram of a non-volatile storage device and a security device.

Referring to FIG. 2, an example block diagram illustrates a non-volatile storage device 202 and a security device 250. The non-volatile storage device 202 includes a non-volatile storage module 204 may include the same features as the non-volatile storage module 104 of FIG. 1. For example, the non-volatile storage module 204 may be partitioned into multiple partitions 216 and 218, as described above with respect to storage module 104 being divided into multiple partitions 116 and 118.

In FIG. 2, the interface module 206, the controller 208, the key storage module 210 and the policy module 212 may be implemented on the security device 250. The security device 250 is a separate chip or separate device from the storage device 202. The security device 250 may communicate with the storage device 202 through an interface 260. The components on the security device 250 (i.e., the interface module 206, the controller 208, the key storage module 210 and the policy module 212) may function in the same manner as the interface module 106, the controller 108, the key storage module 110 and the policy module 112 of FIG. 1.

In this manner, the security device 250 may be matched with different storage devices 202 to ensure that only cryptographically signed data that has been verified can be written to and read out of the storage device 202. For example, the controller 208 may partition the storage module 204 into a first partition 216 and a second partition 218. The controller 208 may designate the first partition 216 as a read-only partition and the second partition 218 as a write-only partition. The external peripheral device 214 may write new data to the storage device 202 through the security device 250. The external peripheral device 214 may sign a cryptographic hash of the data using a private key, append the signature to the data and communicate the data to the storage device 202 through the security device 250.

The interface module 206 receives the data and the controller 208 directs the data to be written to the second partition 218, which is the write-only storage area, using the interface 260. The controller 208 verifies the signature appended to the data using a key stored in the key storage module 210. If the controller successfully verifies the signature, then the first partition 216 and the second partition 218 are re-designated as the write-only partition and the read-only partition, respectively. In this manner, the new data that was written to the second partition 218 may be read out by a subsequently received read command. If the controller 208 is not able to verify the signature or if an incomplete copy of the data is received, then the controller 208 will not re-designate the partitions 216 and 218 and subsequent read commands will not read out the new data, but instead will continue to read out data stored in the first partition 216. The controller 208 may perform these and other additional functions, as may be described above with respect to the controller 108 of FIG. 1.

In another example implementation, the key storage module 210 may be implemented on the non-volatile storage device 202, instead of being implemented on the security device 250. In this implementation, the controller 208 may be on the security device 250 and may interact with the key storage module 210, which may be implemented on the non-volatile storage device 202 to verify signatures using one or more keys stored in the key storage module 210.

Figure 3:
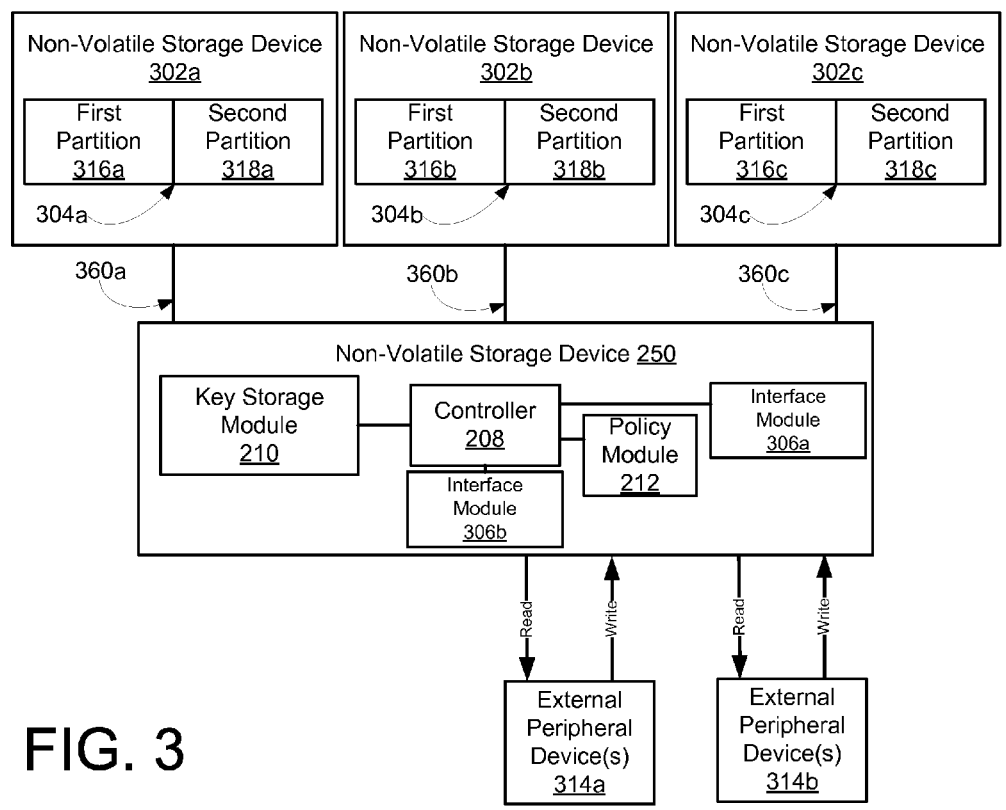
FIG. 3 is an example block diagram of multiple non-volatile storage devices and the security device of FIG. 2.

Referring to FIG. 3, an example block diagram illustrates multiple non-volatile storage devices 302a-302c having storage modules 304a-304c and the security device 250 of FIG. 2. In the example of FIG. 3, a single security device 250 may control reads of data and writes of data for multiple storage devices 302a-302c through respective interfaces 360a-360c. The security device 250 may function the same as the security device 250 described above in FIG. 2. The controller 208 may function to verify signatures appended to data being written to one of the storage device 302a-302c from one or more external peripheral devices 314a and 314b. The controller 208 directs the data to the partition in the storage device designated as the write-only partition. Upon verification of the signature using the key in the key storage module 210, the controller 208 re-designates the partitions for the particular storage device. If the verification fails, then the controller 208 does not re-designate the partitions.

In the example of FIG. 3, the security device 250 may include multiple interface modules 306a and 306b. The interface modules 306a and 306b may be different types of interfaces. For example, the interface module 306a may be a serial interface module and the interface module 306b may be a parallel interface module. The interface modules 306a and 306b may be compatible with some or all of the external peripheral devices 314a and 314b depending on the type of interface used between the peripheral devices and the security module 250.

In this example of FIG. 3, the security device 250 is flexible because it can be coupled to multiple non-volatile storage devices 302a-302c and multiple external peripheral devices 314a and 314b using different types of interfaces through the interface modules 306a and 306b. In a similar manner, the interfaces 360a-360c may be different types of interfaces (e.g., serial and parallel interfaces) to interface with different types of non-volatile storage devices 302a-302c.

Figure 4:
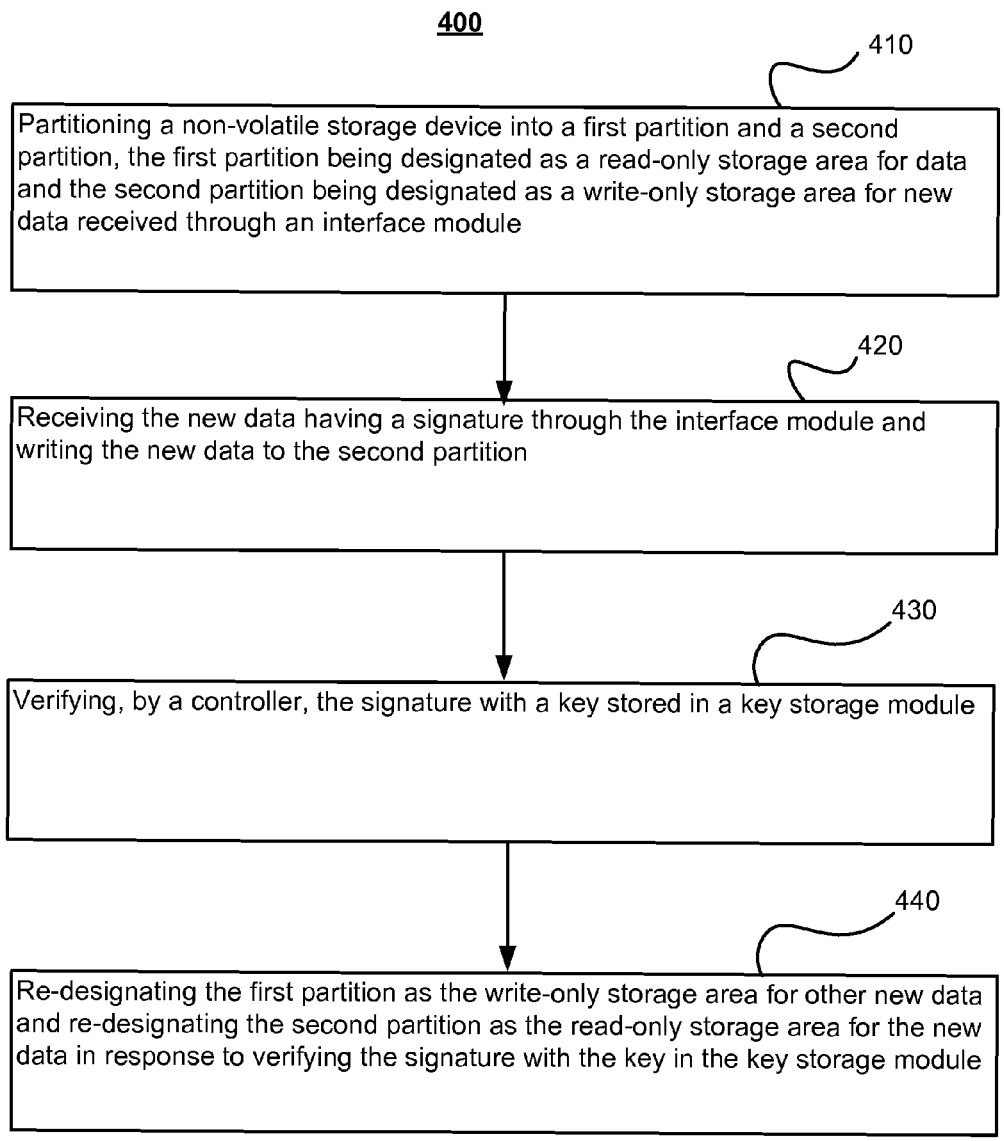
FIG. 4 is an example flowchart illustrating example operations of the devices of FIGS. 1-3.

Referring to FIG. 4, an example flowchart illustrates a process 400. The process 400 illustrates example operations of the devices described above in FIGS. 1-3. Process 400 includes partitioning a non-volatile storage device into a first partition and a second partition, where the first partition is designated as a read-only storage area for data and the second partition is designated as a write-only storage area for new data received through an interface module (410). For example, the storage device 102 includes a storage module 104 that may be partitioned into a first partition 116 and a second partition 118, with the first partition 116 designated as the read-only storage area for data and the second partition 118 designated as the write-only storage area new data received through the interface module 112 (410).

Process 400 includes receiving the new data having a signature through the interface module and writing the new data to the second partition (420). For example, the interface module 106 may receive new data from an external peripheral device 114, where the data includes a signature created using a private key. The new data may be written to the second partition 118 (420).

Process 400 includes verifying, by a controller, the signature with a key stored in a key storage module (430). For example, the controller 108 may verify the signature with a key stored in the key storage module 110 (430).

Process 400 includes re-designating the first partition as the write-only storage area for other new data and re-designating the second partition as the read-only storage area for the new data in response to verifying the signature with the key stored in the key storage module (440). For example, the controller 108 may re-designate the first partition 116 as the write-only storage area for other new data. The controller 108 may re-designate the second partition 118 as the read-only storage area for the new data in response to the controller 108 verifying the signature with the key stored in the key storage module 110 (440). If the controller 108 is not able to verify the signature, then the partitions are not re-designated.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-volatile memory chip, comprising:
an interface module;
a controller that is operably coupled to the interface module;
a key storage module that is operably coupled to the controller, the key storage module being configured to store a key;

a non-volatile storage module that is operably coupled to the controller and configured to store data, the non-volatile storage module having a first partition and a second partition, wherein:
  the first partition is designated as a read-only storage area for the data,
  the second partition is designated as a write-only storage area for new data received through the interface module, and
  the first partition is re-designated as the write-only storage area for other new data and the second partition is re-designated as the read-only storage area for the new data in response to the new data being written to the second partition with a signature and the controller verifying the signature using the key stored in the key storage module; and
a policy module that is operably coupled to the controller and configured to:
  store version information related to the new data in the second partition, and
  receive and store policy information using a bitmask, wherein the bitmask is used as a permissions mask and the bitmask is used to assign unique identifier information to uniquely identify the non-volatile memory chip.

2. The non-volatile memory chip of claim 1 wherein the first partition is re-designated as the write-only storage area for other new data and the second partition is re-designated as the read-only storage area for the new data in response to receiving a complete copy of the new data with the signature and the controller verifying the signature using the key stored in the key storage module.

3. The non-volatile memory chip of claim 1 wherein the new data includes a new key, the new key being stored in the key storage module and made active in response to the controller verifying the signature using the key stored in the key storage module.

4. The non-volatile memory chip of claim 3 wherein the new key is deleted from the second partition such that the new key is stored only in the key storage module.

5. The non-volatile memory chip of claim 1 wherein the first partition is not re-designated as the write-only storage area for other new data and the second partition is not re-designated as the read-only storage area for the new data in response to the controller being unable to verify the signature using the key stored in the key storage module.

6. The non-volatile memory chip of claim 1 wherein the first partition is not re-designated as the write-only storage area for other new data and the second partition is not re-designated as the read-only storage area for the new data in response to the receiving an incomplete write of the new data through the interface module.

7. The non-volatile memory chip of claim 1 wherein the new data is read from the second partition as plaintext.

8. The non-volatile memory chip of claim 1 wherein the first partition and the second partition are a same size.

9. The non-volatile memory chip of claim 1 wherein the interface module comprises a serial interface module.

10. The non-volatile memory chip of claim 1 wherein the interface module comprises a parallel interface module.

11. The non-volatile memory chip of claim 1 wherein the non-volatile memory chip is an electrically erasable programmable read-only memory (EEPROM).

12. The non-volatile memory chip of claim 1 wherein the key stored in the key storage module is a public key that corresponds to a private key used to create the signature outside of the non-volatile memory chip.

13. The non-volatile memory chip of claim 1 wherein the key stored in the key storage module is a shared secret key that corresponds to a shared secret key used to create the signature outside of the non-volatile memory chip.

14. A non-volatile security chip, comprising:
  an interface module;
  a key storage module that is configured to store a key; and
  a controller that is operably coupled to the interface module and to the key storage module, the controller being configured to interface with an external non-volatile memory chip for storing data and the controller being configured to:
    partition the external non-volatile memory chip into a first partition and a second partition, the first partition being designated as a read-only storage area for the data and the second partition being designated as a write-only storage area for new data received through the interface module,
    receive the new data having a signature through the interface module and write the new data to the second partition,
    verify the signature using the key stored in the key storage module,
    re-designate the first partition as the write-only storage area for other new data and re-designate the second partition as the read-only storage area for the new data in response to verifying the signature using the key stored in the key storage module; and
    store version information related to the new data in the second partition in a policy module and store policy information using a bitmask in the policy module, wherein the bitmask is used as a permissions mask and is used to assign unique identifier information to uniquely identify the external non-volatile memory chip.

15. The non-volatile security chip of claim 14 wherein the controller is configured to re-designate the first partition as the write-only storage area for other new data and re-designate the second partition as the read-only storage area for the new data in response to receiving a complete copy of the new data and in response to verifying the signature using the key stored in the key storage module.

16. The non-volatile security chip of claim 14 wherein the new data includes a new key, the new key being stored in the key storage module and made active in response to the controller verifying the signature using the key stored in the key storage module.

17. The non-volatile security chip of claim 16 wherein the new key is deleted from the second partition such that the new key is stored only in the key storage module.

18. The non-volatile security chip of claim 14 wherein the controller is configured to not re-designate the first partition as the write-only storage area for other new data and not re-designate the second partition as the read-only storage area for the new data in response to the controller not being able to verify the signature using the key stored in the storage module.

19. The non-volatile security chip of claim 14 wherein the controller is configured to not re-designate the first partition as the write-only storage area for the other new data and not re-designate the second partition as the read-only storage area for the new data is response to receiving an incomplete write of the new data through the interface module.

20. The non-volatile security chip of claim 14 wherein the external non-volatile memory chip is an electrically erasable programmable read-only memory (EEPROM).

21. The non-volatile security chip of claim 14 wherein the interface module comprises a serial interface module.

22. The non-volatile security chip of claim 14 wherein the interface module comprises a parallel interface module.

23. The non-volatile security chip of claim 14 wherein the key stored in the key storage module is a public key that corresponds to a private key used to create the signature outside of the apparatus.

24. The non-volatile security chip of claim 14 wherein the key stored in the key storage module is a shared secret key that corresponds to a shared secret key used to create the signature outside of the apparatus.

25. A method, comprising:

partitioning a non-volatile memory chip into a first partition and a second partition, the first partition being designated as a read-only storage area for data and the second partition being designated as a write-only storage area for new data received through an interface module;

receiving the new data having a signature through the interface module and writing the new data to the second partition;

verifying, by a controller, the signature with a key stored in a key storage module;

re-designating the first partition as the write-only storage area for other new data and re-designating the second partition as the read-only storage area for the new data in response to verifying the signature with the key stored in the key storage module;

storing version information related to the new data in the second partition in a policy module; and storing policy information using a bitmask in the policy module, wherein the bitmask is used as a permissions mask and is used to assign unique identifier information to uniquely identify the non-volatile memory chip.

26. The method of claim 25 wherein the non-volatile memory chip is an electrically erasable programmable read-only memory (EEPROM).

27. The method of claim 25 wherein the non-volatile memory chip is an electrically erasable programmable read-only memory (EEPROM) that is external to the controller.

* * * * *